United States Patent [19]
Yang

[11] Patent Number: 5,731,904
[45] Date of Patent: Mar. 24, 1998

[54] FABRICATING AN OPTICAL DEVICE HAVING AT LEAST AN OPTICAL FILTER AND A MIRROR

[75] Inventor: Long Yang, Union City, Calif.

[73] Assignee: Hewlett-Packard Co., Palo Alto, Calif.

[21] Appl. No.: 705,872

[22] Filed: Aug. 28, 1996

[51] Int. Cl.$^6$ .................................................. G02B 27/14
[52] U.S. Cl. ............................................ 359/634; 359/629
[58] Field of Search ..................................... 359/618, 629, 359/634, 811, 819, 831, 833, 834

[56] References Cited

U.S. PATENT DOCUMENTS

| | | | |
|---|---|---|---|
| 4,789,214 | 12/1988 | Vilhelmsson et al. | 385/147 |
| 4,790,616 | 12/1988 | Frenkel et al. | 385/47 |
| 5,124,281 | 6/1992 | Ackerman et al. | 437/209 |
| 5,181,216 | 1/1993 | Ackerman et al. | 372/36 |
| 5,291,572 | 3/1994 | Blonder et al. | 385/94 |
| 5,301,067 | 4/1994 | Bleier et al. | 359/857 |
| 5,307,434 | 4/1994 | Blonder et al. | 385/91 |
| 5,367,589 | 11/1994 | MacDonald et al. | 385/37 |
| 5,439,782 | 8/1995 | Haemmerle et al. | 430/321 |
| 5,477,328 | 12/1995 | Tokumaru | 356/437 |
| 5,506,728 | 4/1996 | Edwards et al. | 359/629 |
| 5,530,586 | 6/1996 | Yasugaki | 359/364 |
| 5,539,577 | 7/1996 | Si et al. | 359/629 |
| 5,625,494 | 4/1997 | Fukushima | 359/634 |
| 5,646,782 | 7/1997 | Anderson | 359/629 |

Primary Examiner—David C. Nelms
Assistant Examiner—Ricky Mack
Attorney, Agent, or Firm—Thomas X. Li

[57] ABSTRACT

An integrated optical device includes a first block of transparent material having first and second side surfaces and a predetermined thickness between the first and second side surfaces. A mirror is applied to the first side surface of the first block and an optical filter is applied to the second side surface of the first block. A second block of transparent material is attached to the optical filter such that the optical filter is located between the first and second blocks. The attached first and second blocks have front and back cut surfaces intersecting the optical filter and the mirror at a predetermined angle. A first sheet of transparent material is attached to the front cut surface and a second sheet of transparent material is attached to the back cut surface. A method of making the integrated optical device is also described.

29 Claims, 19 Drawing Sheets

45° SAW CUTS 5,731,904

FABRICATING AN OPTICAL DEVICE HAVING AT LEAST AN OPTICAL FILTER AND A MIRROR

BACKGROUND OF THE INVENTION

1. Field of the Invention

The present invention pertains to fiber optics or photonics modules. More particularly, this invention relates to fabricating an optical device with at least an optical filter and a mirror.

2. Description of the Related Art

Optical communications systems are widely used for carrying very large amount of information with low error rate and at low cost over great distances. For this reason, considerable development has been done on components of optical communication systems, such as photonics packages or modules. Photonics generally refers to devices that share both electronic and optical attributes. These devices can be laser devices, which generate coherent light in response to an electronic signal, and photo detectors, which generate an electronic signal in response to light.

Typically, bidirectional photonics modules use edge-emitting semiconductor lasers and surface-detecting photo detectors (see FIG. 1). As can be seen from FIG. 1, since an edge-emitting laser 11 has a relatively wide radiation angle, a lens 12 is typically inserted between the laser 11 and an optical fiber 13 to obtain high optical coupling efficiency. In addition, a lens 17 is typically inserted between the optical fiber 13 and a photo detector 15. The inserted lens 17 improves the optical coupling efficiency between the optical fiber 13 and the photo detector 15. Because the photonics module 10 is a bidirectional module, an optical filter 18 is used to reflect the light beam emitted from the optical fiber 13 to the lens 17 and to allow the light beam from the lens 12 to reach the optical fiber 13.

In making the photonics module 10, the laser 11, the lens 12, the optical filter 18, and the optical fiber 13 must be in precise predetermined alignment with one another. In addition, the optical fiber 13, the optical filter 18, the lens 17, and the photo detector 15 must be in precise predetermined alignment with one another. To achieve this, fixtures and/or mounts are typically needed to hold the components in place and in alignment with one another, as shown in FIG. 2.

As can be seen from FIG. 2, a fixture 21 is used to hold the lens 12 in place and in predetermined alignment with the laser 11 that is also mounted on the fixture 21. This fixture 21 is then coupled to another fixture 22 that holds the optical fiber 13 and the optical filter 18 in place. A third fixture 20 is used to hold the lens 17 in place and in alignment with the photo detector 15. The fixture 20 also mounts and secures the photo detector 15. Because the photo detector 15 is the surface-detecting photo detector, the photo detector 15 is mounted on the fixture 20 perpendicular to the incoming light, as shown in FIG. 2. The fixture 20 is also coupled to the fixture 22. The alignment of the laser 11, the lenses 12 and 17, the photo detector 15, the optical filter 18, and the optical fiber 13 is achieved by the fixtures 20 through 22.

One disadvantage of such photonics modules or packages is that the fixtures are typically relatively costly to fabricate because they typically require relatively high precision. Another disadvantage is that it is typically time consuming to assemble the photonics modules using the fixtures, thus causing low throughput. In addition, time may also be needed for alignment and adjustment during assembling the photonics modules. This typically hinders mass-production of the photonics modules by operators having a moderate level of skill while maintaining the required alignment criteria. These factors typically limit the cost reduction of the photonics modules.

Prior attempts have been made to mount a number of components (e.g., a laser and a spherical lens) on a single silicon mounting member. However, it is typically difficult to precisely mount and align a planar optical device such as the optical filter 10 of FIGS. 1–2 on a planar surface of a mounting member using conventional mounting mechanisms because it is difficult to define the three-dimensional location of the planar optical device on the planar surface of the mounting member. Mounting the planar optical device on the planar surface of the mounting member requires active alignment and complex bonding and packaging steps. In addition, additional optical element such as a mirror may also be required which further complicates the mounting.

SUMMARY OF THE INVENTION

The present invention integrates at least one mirror and one optical filter into a single optical device at low cost.

The present invention allows an integrated optical device having at least one optical filter and one mirror to be fabricated by batch processing. The present invention allows the alignment of an optical filter and a mirror with respect to other optical elements to be precisely determined.

The present invention integrates at least one mirror and one optical filter into a single optical device such that the distance between the mirror and optical filter can be precisely determined during fabrication.

An integrated optical device is described that includes (1) a first block of transparent material having first and second side surfaces and a predetermined thickness between the first and second side surfaces and (2) a second block of transparent material. A mirror is applied to the first side surface of the first block. An optical filter is attached to (1) the second side surface of the first block and (2) the second block such that the optical filter is located between the first and second blocks. The first and second blocks have front and back surfaces intersecting the optical filter and the mirror at a predetermined angle.

Other features and advantages of the present invention will become apparent from the following detailed description, taken in conjunction with the accompanying drawings, illustrating by way of example the principles of the invention.

DETAILED DESCRIPTION OF THE INVENTION

Figure 1:
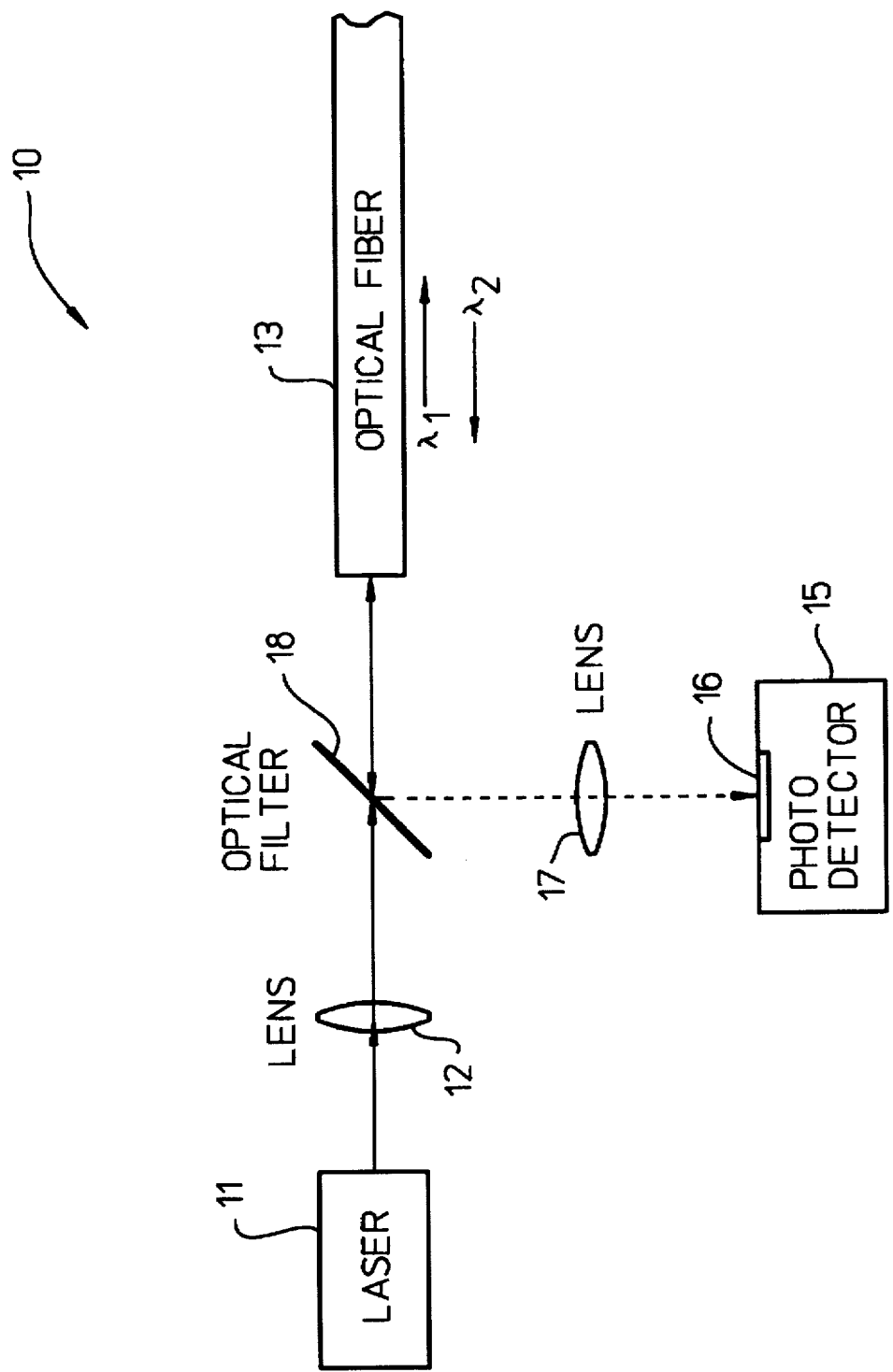
FIG. 1 schematically shows a prior art bidirectional photonics module.
Figure 2:
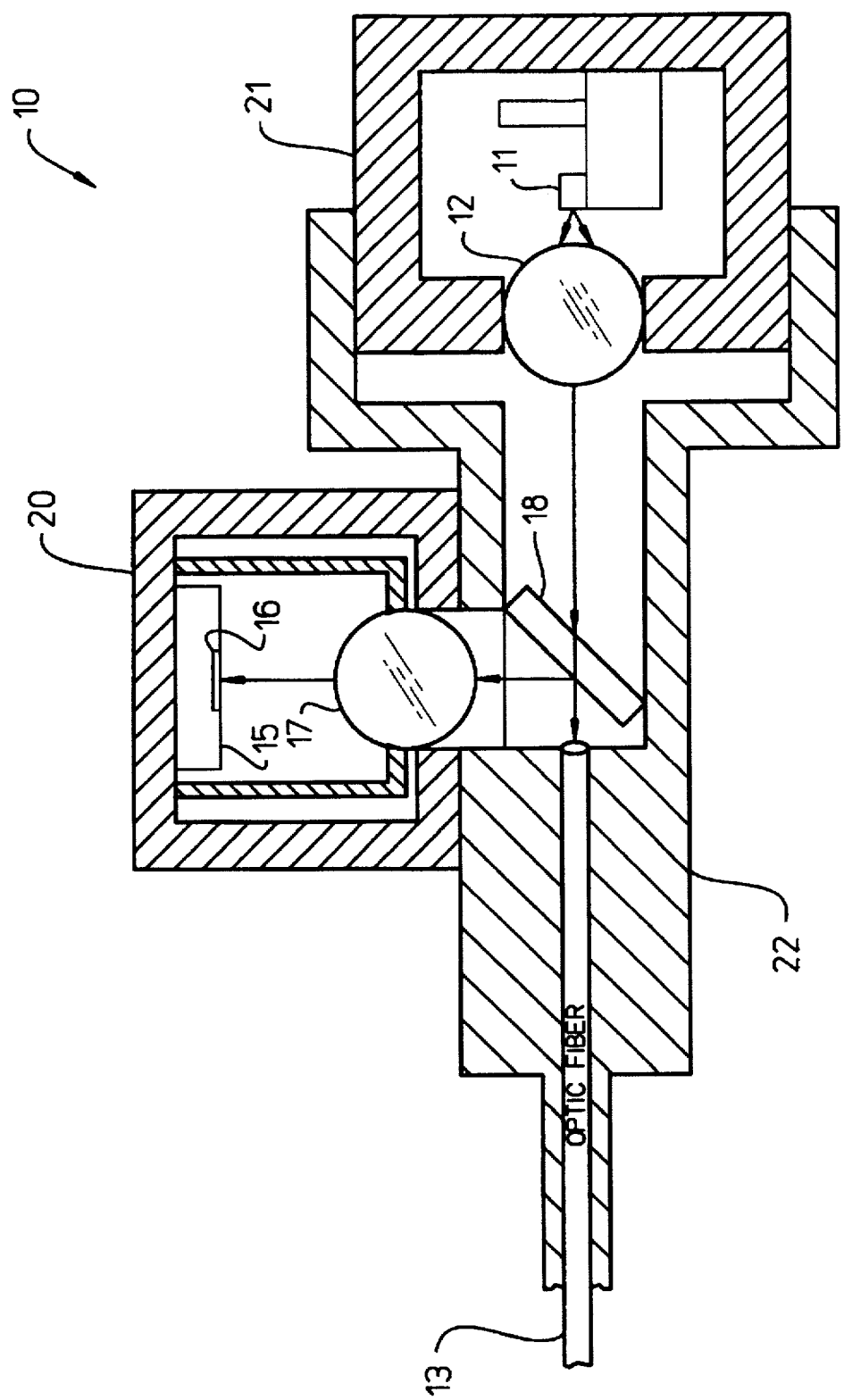
FIG. 2 is a side cross sectional view showing the package of the bidirectional photonics module of FIG. 1.
Figure 3:
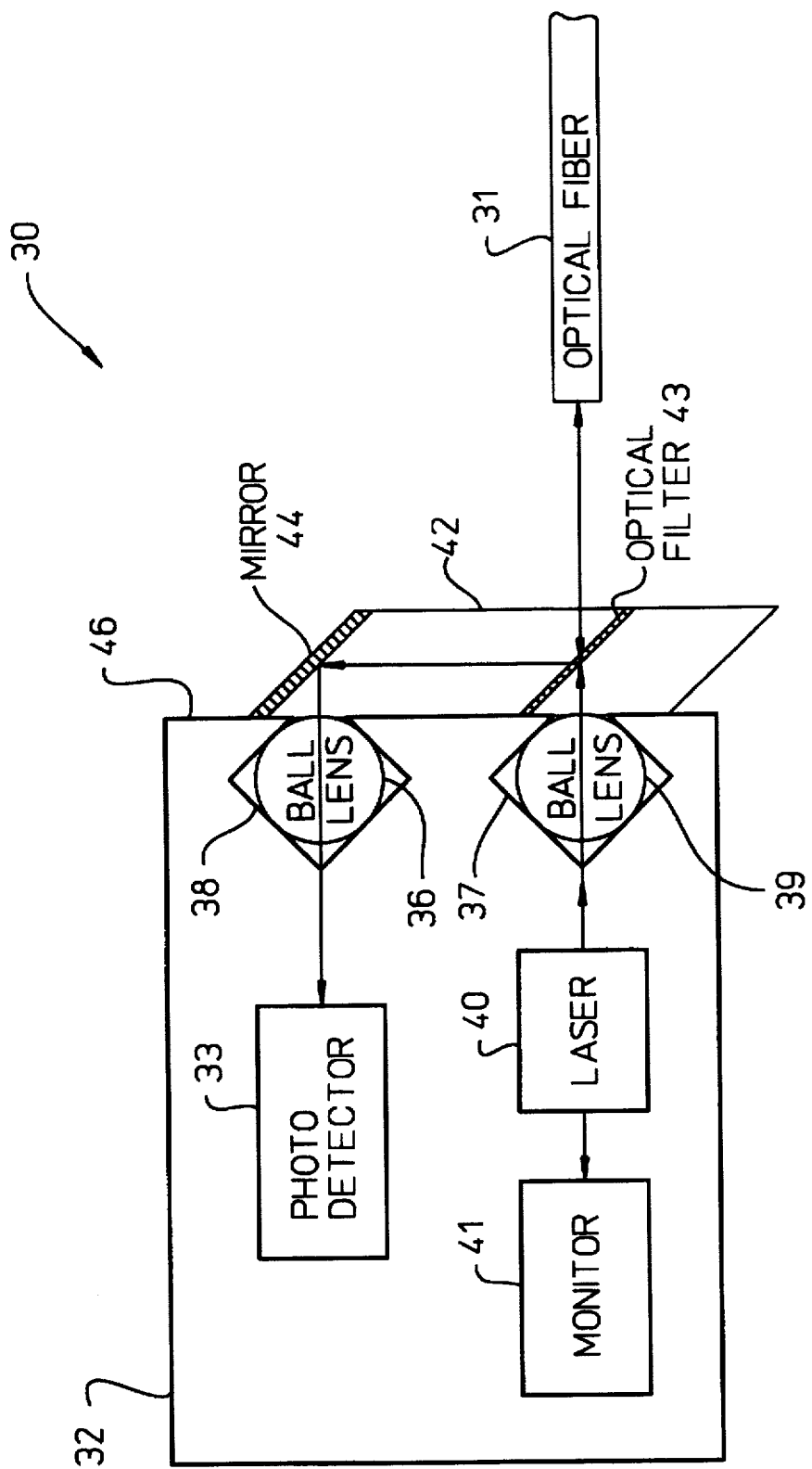
FIG. 3 is a top view of a bidirectional photonics module having an integrated optical device that integrates an optical filter with a mirror in accordance with one embodiment of the present invention.
Figure 4A:
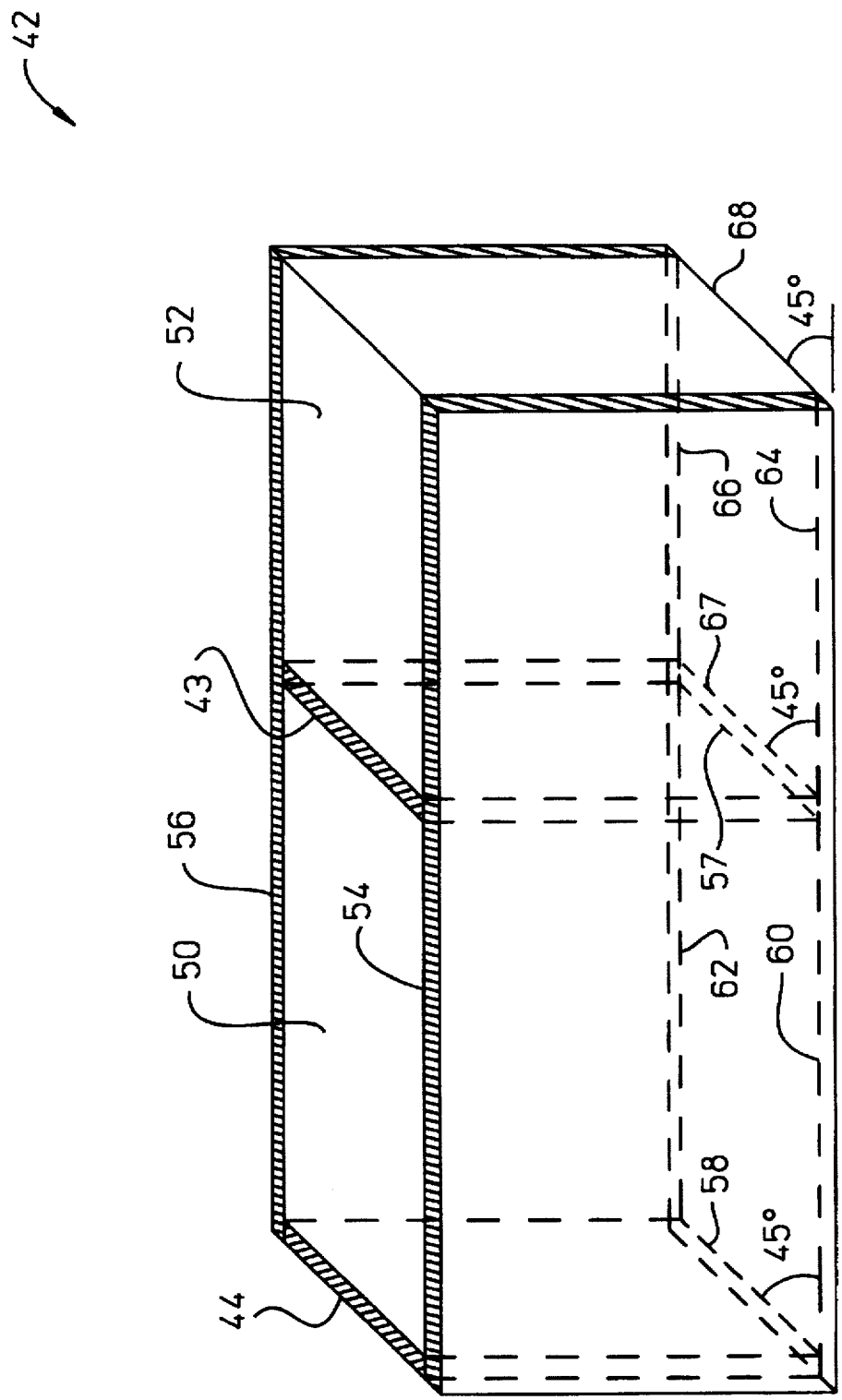
FIGS. 4A through 4C show the integrated optical device of FIG. 3.
Figure 4B:
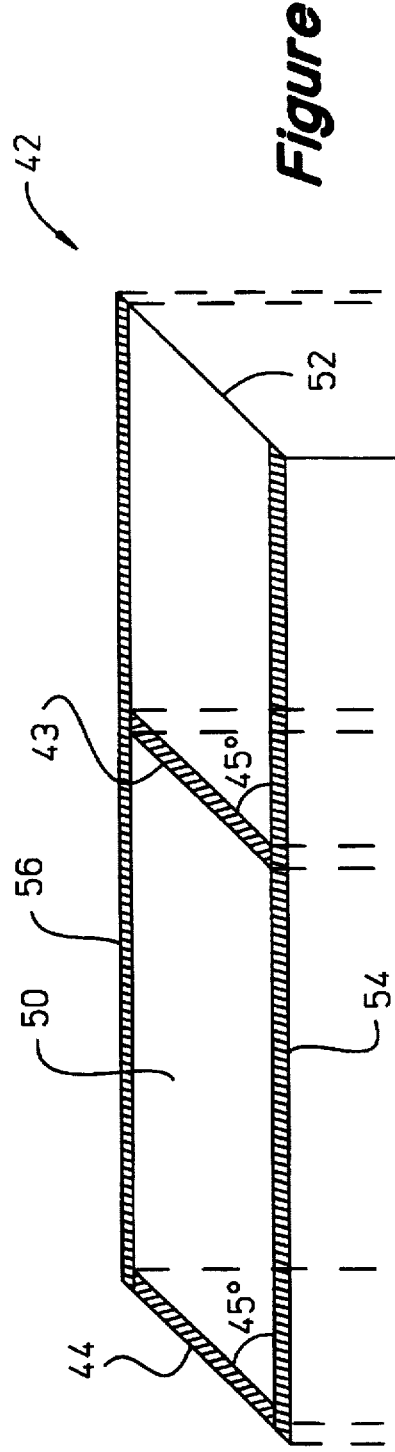
Figure 4C:
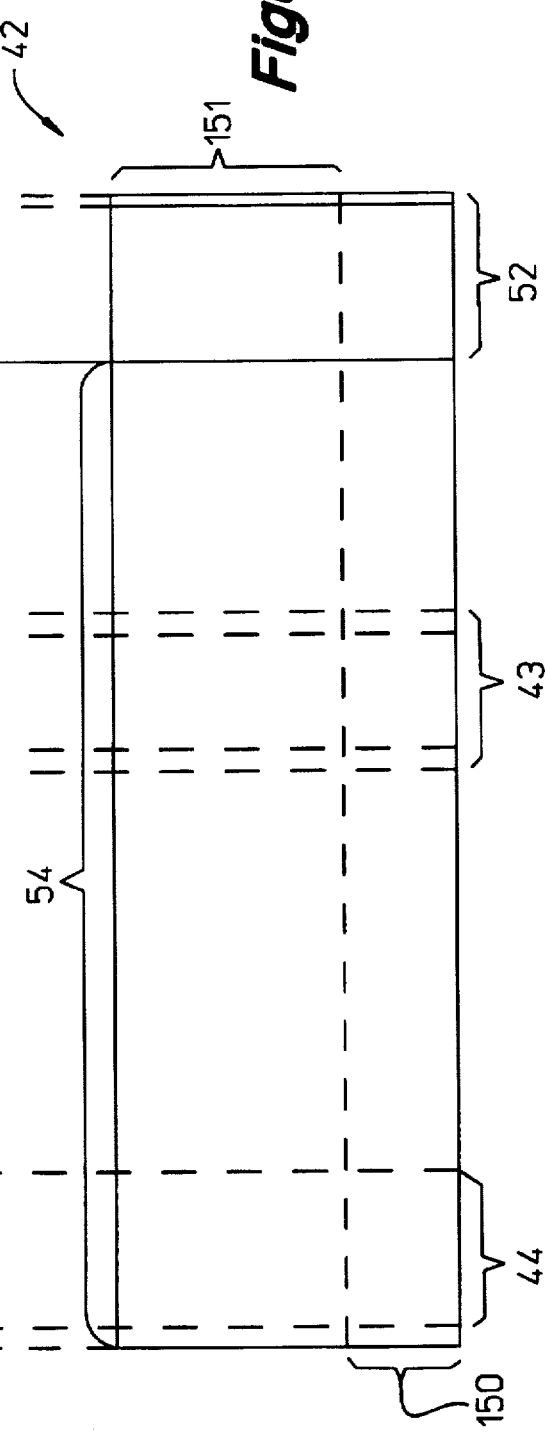
Figure 4D:
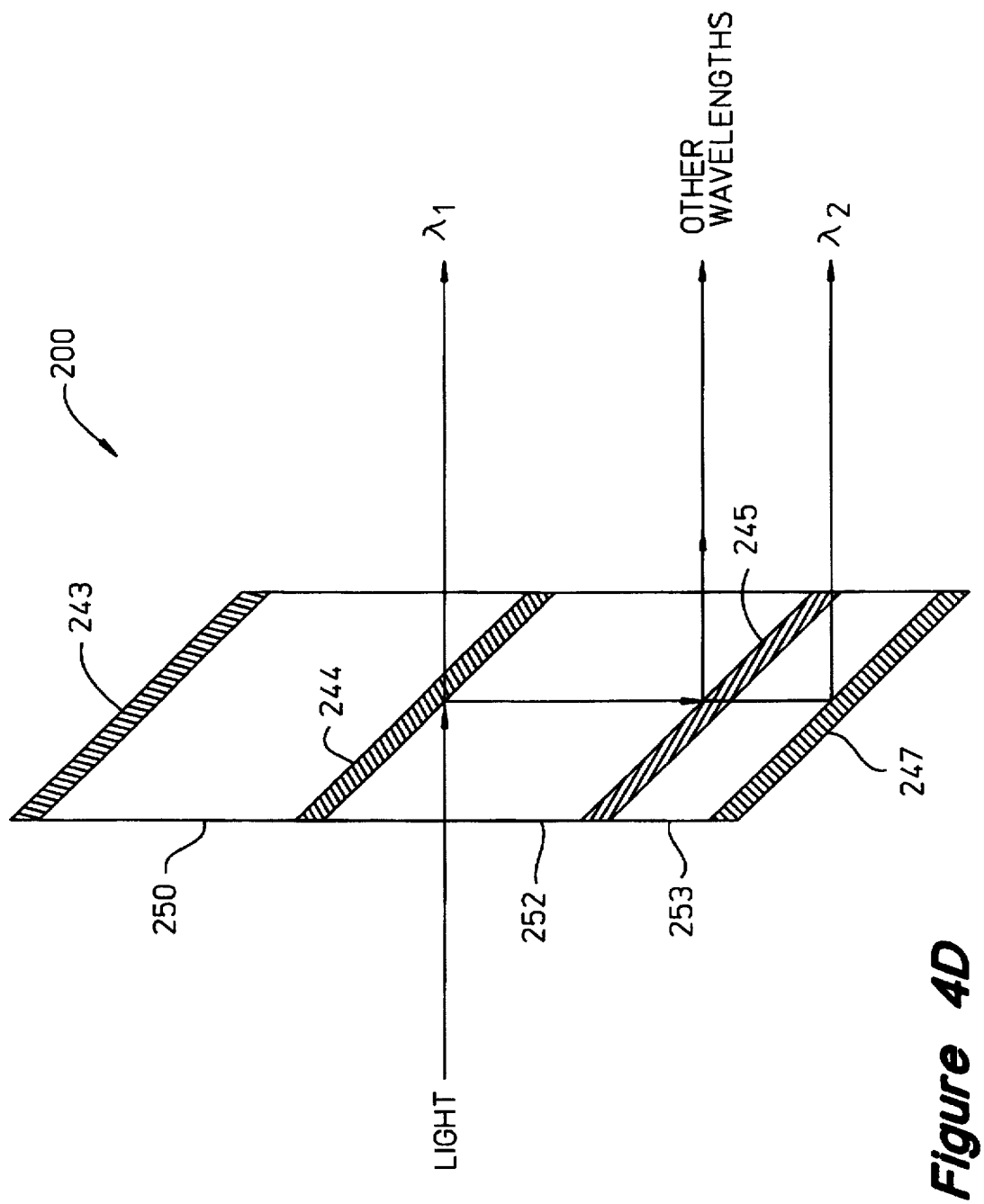
FIGS. 4D through 4H show alternative embodiments of the integrated optical device of FIGS. 3 through 4C.
Figure 4E:
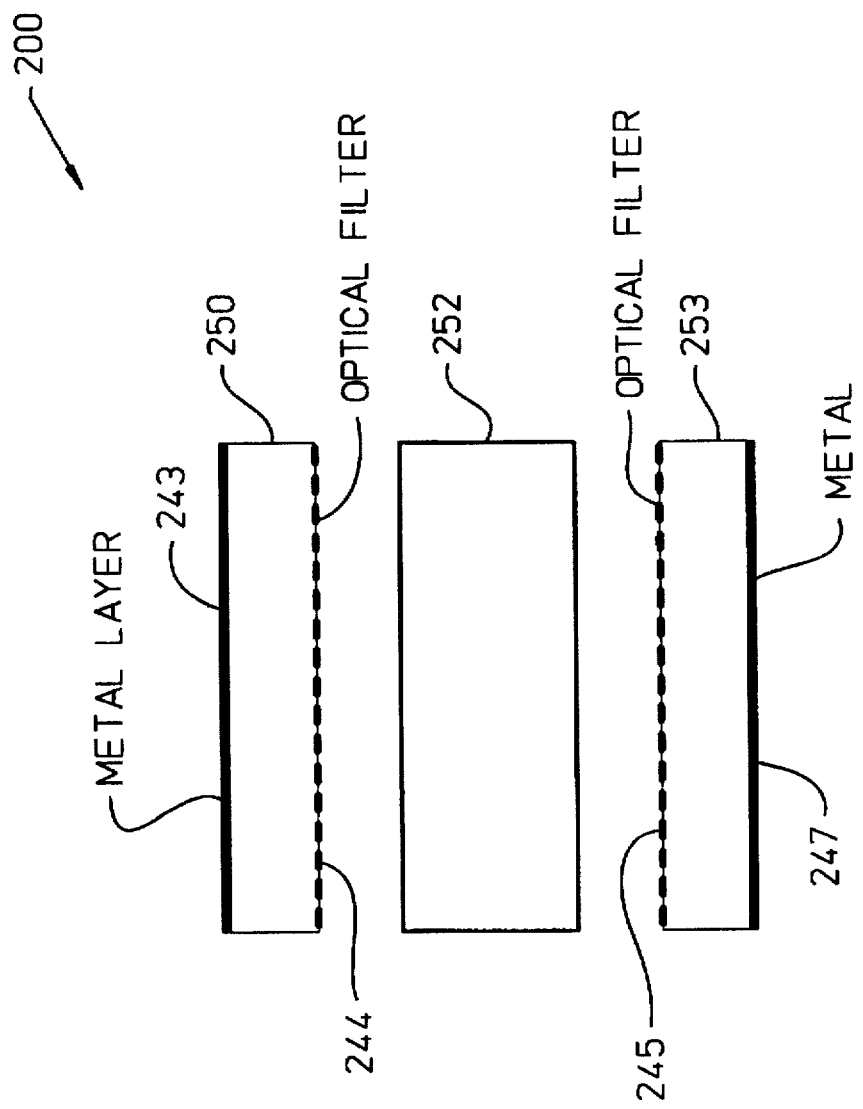

FIG. 3 is a top view of a photonics module 30 having an integrated optical device 42 that integrates at least one optical filter 43 and one mirror 44 into a single optical device in accordance with one embodiment of the present invention. As will be described in more detail below, the optical filter 43 and the mirror 44 are integrated into the single optical device 42 such that the distance between the mirror 44 and the optical filter 43 is precisely defined. In addition, the integration allows alignments of the optical filter 43 and the mirror 44 with respect to other optical elements of the photonics module 30 to be precisely predefined. Moreover, the integration also allows the optical device 42 to be fabricated at low cost using batch processing. FIG. 4A is a perspective view of the integrated optical device 42. FIG. 4B is a top view of the optical device 42 and FIG. 4C is a front view of the optical device 42. FIGS. 4D and 4E show alternative embodiments of the optical device 42 of FIGS. 3 through 4C. The process of fabricating the integrated optical device 42 in accordance with one embodiment of the present invention is shown in FIGS. 5 through 9.

As can be seen from FIG. 3, the photonics module 30 is a bidirectional photonics module. Alternatively, the photonics module 30 may not be bidirectional. For example, the photonics module 30 may be tri-directional or uni-directional.

The photonics module 30 includes a laser 40, a photo detector 33, a monitor 41, and spherical lenses 36 and 39, in addition to the integrated optical device 42. The monitor 41 is a photo detector that functions as a back facet monitor of the laser 40. The laser 40, the photo detector 33, the monitor 41, and the spherical lenses 36 and 39 are mounted on a mounting member 32. An optical fiber 31 is then optically coupled to the components of the photonics module 30 that are mounted on the mounting member 32. In one embodiment, each of the spherical lenses 36 and 39 is a ball lens.

In one embodiment, the mounting member 32 is made of semiconductor material. Using semiconductor material for the mounting member 32 allows the mounting member 32 to be processed by a photolithographic masking and anisotropic etching process that can very precisely define the locations of the components of the photonics module 30 on the mounting member 32. This also allows the photonics module 30 to be made very small and from a silicon wafer by batch processing.

The mounting member 32 is preferably made of <100> monocrystalline silicon in which the top and bottom surfaces are both <100> crystallographic surfaces. Alternatively, other crystalline semiconductor materials can be used to form the mounting member 32.

The mounting member 32 includes two substantially pyramidal cavities 37 and 38. The pyramidal cavities 37–38 are formed for seating the spherical lenses 36 and 39. The pyramidal cavities 37–38 are formed using the photolithographic masking and anisotropic etching process such that their respective side walls lie on the <111> crystallographic planes of the mounting member 32. Each of the pyramidal cavities 37–38 has a substantially square opening. The laser 40 is bonded onto the top surface of the mounting member 32 in alignment with a diagonal of the pyramidal cavity 37. Likewise, the photo detector 33 is bonded onto the top surface of the mounting member 32 in alignment with a diagonal of the pyramidal cavity 38. Each of the spherical lenses 36 and 39 is seated in one of pyramidal cavities 37 and 38. The location of the pyramidal cavity 37 is defined such that when the spherical lens 39 is seated in the cavity 37, the spherical lens 39 is at the focal point of the laser 40. Likewise, the location of the pyramidal cavity 38 is defined such that when the spherical lens 36 is seated in the cavity 38, the photo detector 33 is at the focal point of the spherical lens 36.

The optical filter 43 is a wavelength-dependent optical filter. This means that if the optical filter 43 is designed to pass light of a wavelength oryx, the optical filter 43 only passes light of the $\lambda_1$ wavelength and reflects light having a wavelength other than $\lambda_1$. In other words, the optical filter 43 serves as a mirror to light having wavelengths other than $\lambda_1$, while being transparent to the light having the wavelength of $\lambda_1$.

The optical filter 43 and the mirror 44 are required in the photonics module 30 to divide the optical path from the optical fiber 31 to the photonics module 30. In this case, the light from the laser 40 to the optical fiber 31 passes through the optical filter 43 while the light from the optical fiber 31 is reflected by the optical filter 43 and the mirror 44 to the photo detector 33.

In order for the optical filter 43 to properly function, the optical filter 43 is inserted into the optical path between the spherical lens 39 and the optical fiber 31. In addition, the optical filter 43 needs to be placed adjacent to the spherical lens 39. The optical filter 43 needs to be in optical alignment with the spherical lens 39 and the optical fiber 31. This optical alignment of the optical filter 43 typically includes a yaw (i.e., rotational) alignment, a pitch (i.e., vertical) alignment, and a lateral alignment. The yaw alignment determines, for example, whether the optical filter 43 intersects the optical axis of the laser 40 and the spherical lens 39 at an appropriate angle. In one embodiment, the appropriate angle is 45°. In alternative embodiments, the appropriate angle can be greater or less than 45°. For example, the appropriate angle can be at 54°.

The pitch alignment determines if the optical filter 43 intersects the top surface of the mounting member 32 at an appropriate angle (e.g., 90°). The lateral alignment determines the distance of the optical filter 43 from the spherical lens 39.

Likewise, to properly reflect light to the spherical lens 36, the mirror 44 needs to be placed adjacent to the spherical lens 36 and in optical alignment with the spherical lens 36 and the optical filter 43. Again, the optical alignment of the mirror 44 includes the yaw alignment, the pitch alignment, and the lateral alignment.

In one embodiment, the yaw alignment of the optical filter 43 and the mirror 44 is a critical alignment and the pitch and lateral alignments are less critical. Alternatively, the vertical and/or lateral alignments can also be critical alignments.

To simplify the above alignments, the optical device 42 integrates the optical filter 43 and the mirror 44 together into a single device (shown in FIGS. 4A–4C). The space between the optical filter 43 and the mirror 44 is set to correspond to the distance between the spherical lenses 36 and 39. The lower portion 150 of the optical device 42 can then simply be attached or bonded to a side surface 46 of the mounting member 32 during packaging such that the optical filter 43 is optically aligned with the spherical lens 39 and the mirror 44 is optically aligned with the spherical lens 36 without active alignment.

In one embodiment, the lower portion 50 of the optical device 42 is bonded to the side surface 46 of the mounting member 32 using epoxy or other adhesive materials. Alternatively, the lower portion 150 of the optical device 42 can be attached to the side surface 46 of the mounting member 32 by other known means.

Integrating the optical filter 43 and the mirror 44 into the optical device 42 reduces the time required to mount the optical filter 43 and the mirror 44 onto the mounting member 32 during packaging. This allows the distance between the mirror 44 and the optical filter 43 to be precisely set and the optical filter 43 and the mirror 44 to be parallel to each other and vertical to the top surface of the mounting member 32. This in turn eliminates the need for active alignment and adjustment between the two elements during packaging. In addition, the integration allows the optical filter 43 and the mirror 44 to be optically readily aligned with the spherical lenses 36 and 39, respectively, when the optical device 42 is attached to the mounting member 32 without the need for active adjustment. Moreover, the optical device 42 can be fabricated at low cost and by batch processing. FIGS. 4A–4C show the integrated optical device 42, which will be described in more detail below.

Referring now to FIGS. 4A–4C, the optical filter 43 of the optical device 42 is located between a first transparent block 50 and a second transparent block 52. The first transparent block 50 is used to provide the predefined space between the optical filter 43 and the mirror 44 and therefore can be referred to as the spacing block. The second transparent block 52 is used to protect the optical filter 43 and therefore can be referred to as the protective block. The spacing and protective blocks 50 and 52 have substantially the same refractive index. The optical filter 43 includes multiple layers of dielectrics and can also be referred to as dielectric stack. The optical filter 43 can be fabricated by any known method.

In one embodiment, each of the spacing and protective blocks 50 and 52 is parallelepiped with four rectangular surfaces and two parallelogram surfaces. Alternatively, each of the spacing and protective blocks 50 and 52 can be in other polyhedral shapes.

In one embodiment, the optical filter 43 is applied to one side surface 57 of the spacing block 50. Then the side surface 67 of the protective block 52 is bonded to the optical filter 43 using, for example, index-matching epoxy. The index-matching epoxy has substantially the same refractive index as that of the spacing and protective blocks 50 and 52. In another embodiment, the optical filter 43 is applied to the side surface 67 of the protective block 52. Then the spacing block 50 is bonded to the optical filter 43 from the side surface 57.

The mirror 44 is formed along another side surface 58 of the spacing block 50. This surface is parallel to the optical filter 43, thus causing the mirror 44 to be parallel to the optical filter 43. The spacing block 50 has a predetermined thickness such that the mirror 44 is at a predetermined distance from the optical filter 43. The predetermined distance is substantially equal to the distance between the centers of the pyramidal cavities 37 and 38. The mirror 44 is formed by applying a metal layer to the side surface 58 of the spacing block 50. The side surfaces 57–58 of the first transparent block 50 are of optical quality. This means that the side surfaces 57–58 do not scatter or distort the incident light. The side surfaces 67–68 of the protective block 52 are also of optical quality.

In one embodiment, the mirror 44 is a gold layer on the side surface 58. In another embodiment, aluminum is used to form the mirror 44. Alternatively, other metals can be used to form the mirror 44. In a further embodiment, the mirror 44 is formed by the optical quality side surface 58 itself and no metal layer is applied to the side surface 58.

In one embodiment, a second mirror (not shown in FIGS. 4A–4C) can be formed on the side surface 68 of the protective block 52. This second mirror reflects any light reflected by the back side of the optical filter 43. Alternatively, the side surface 68 can simply be coated with an anti-reflective coating to allow light reflected by the back side of the optical filter 43 to leave the optical device 42.

Figure 4F:
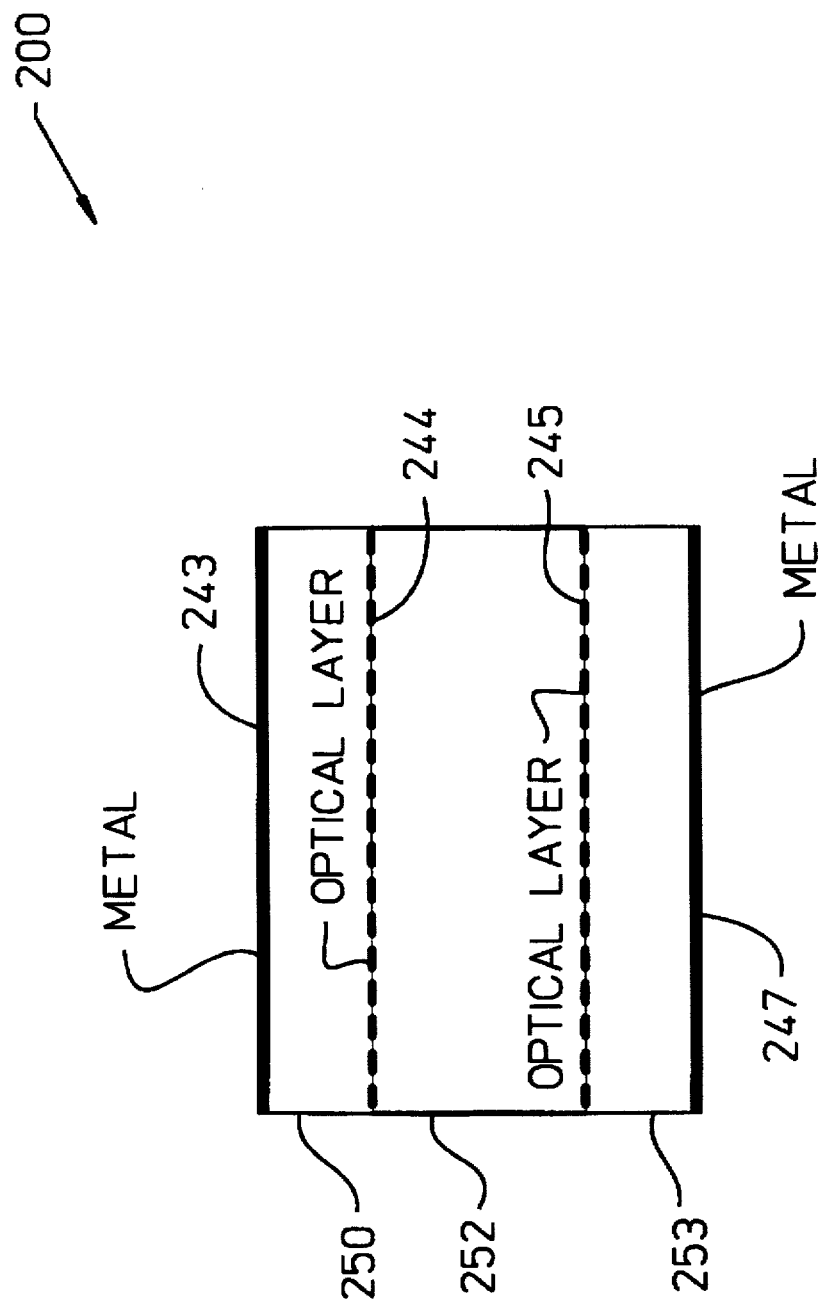
Figure 4G:
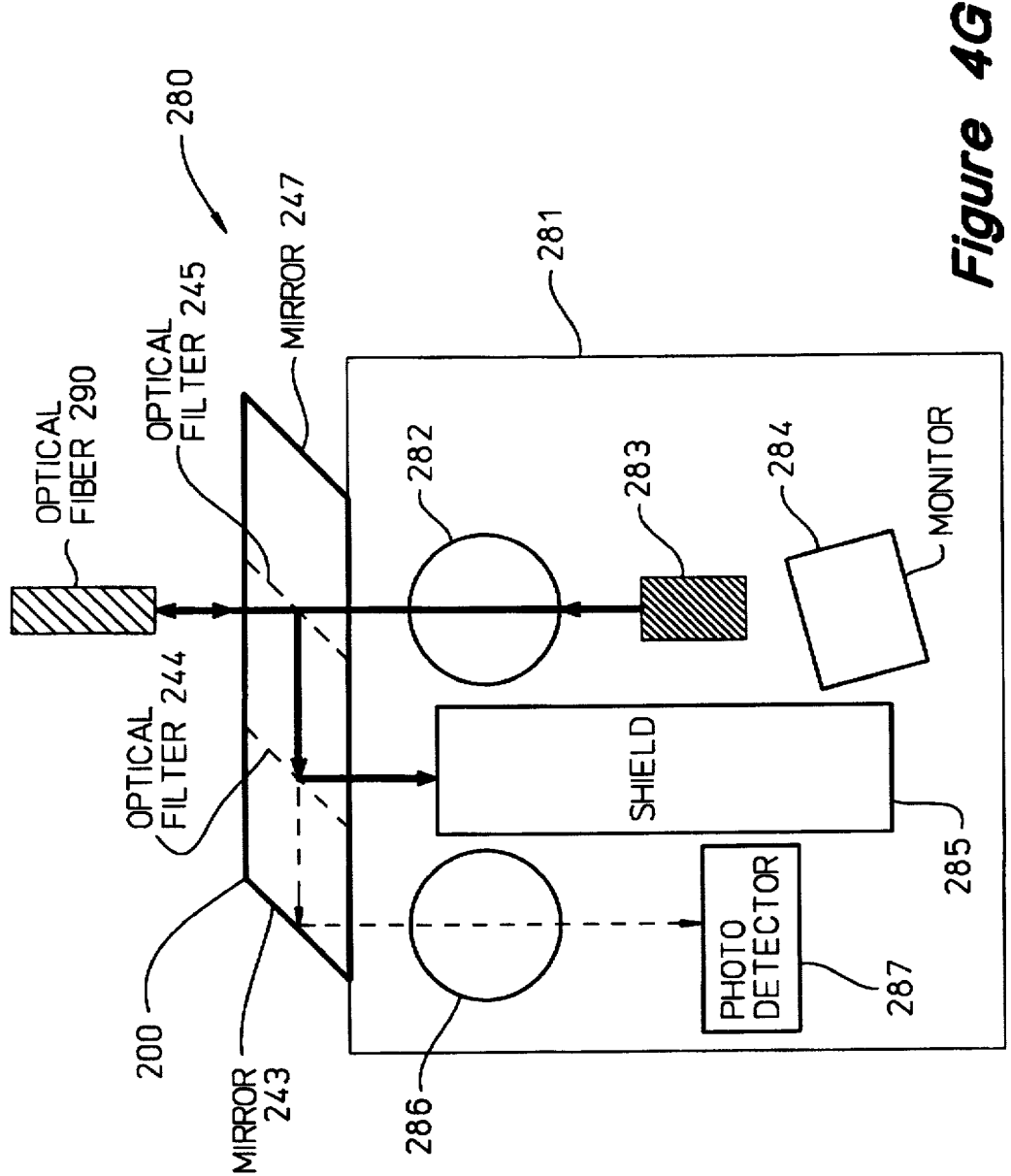
Figure 4H:
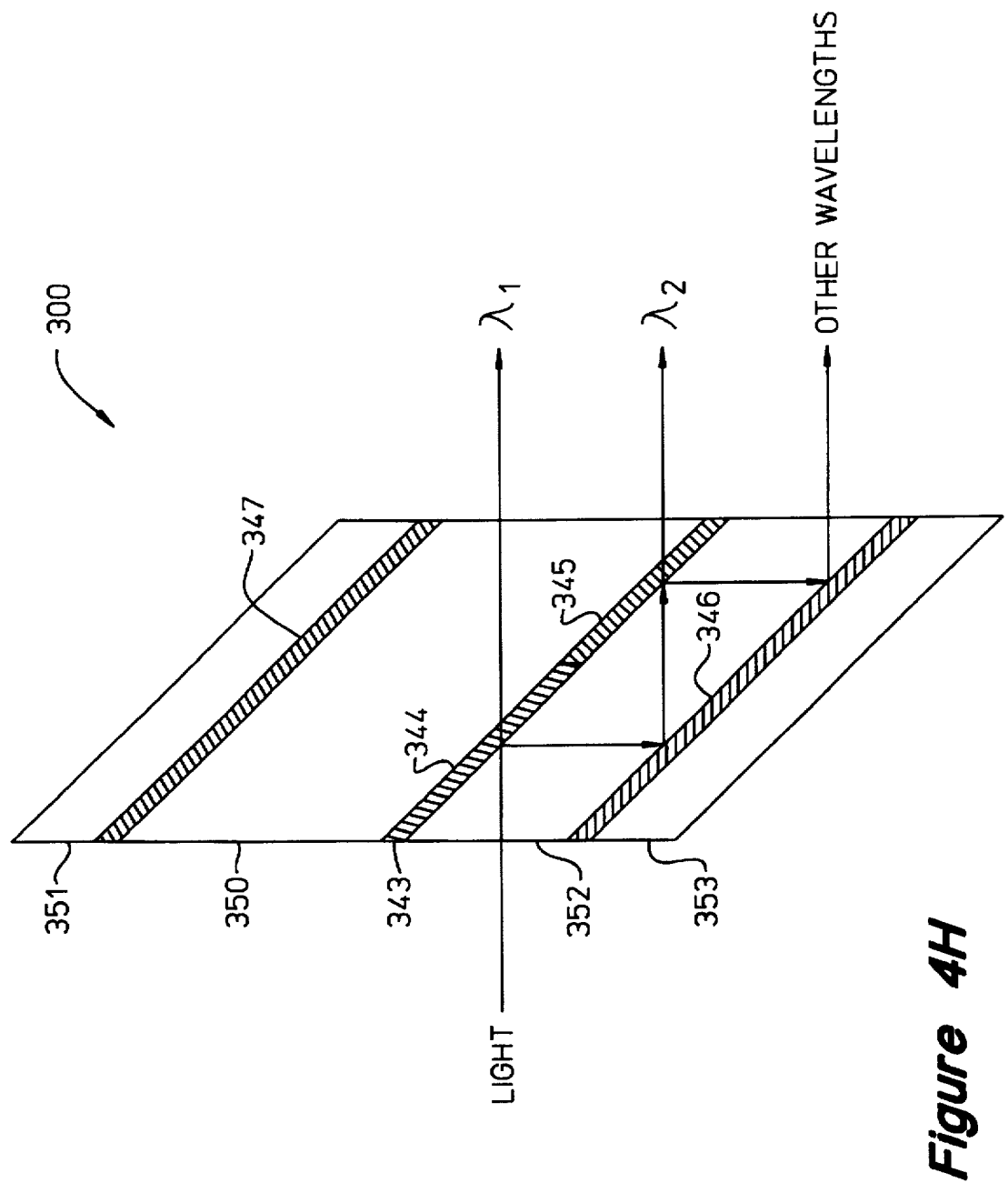
Figure 5:
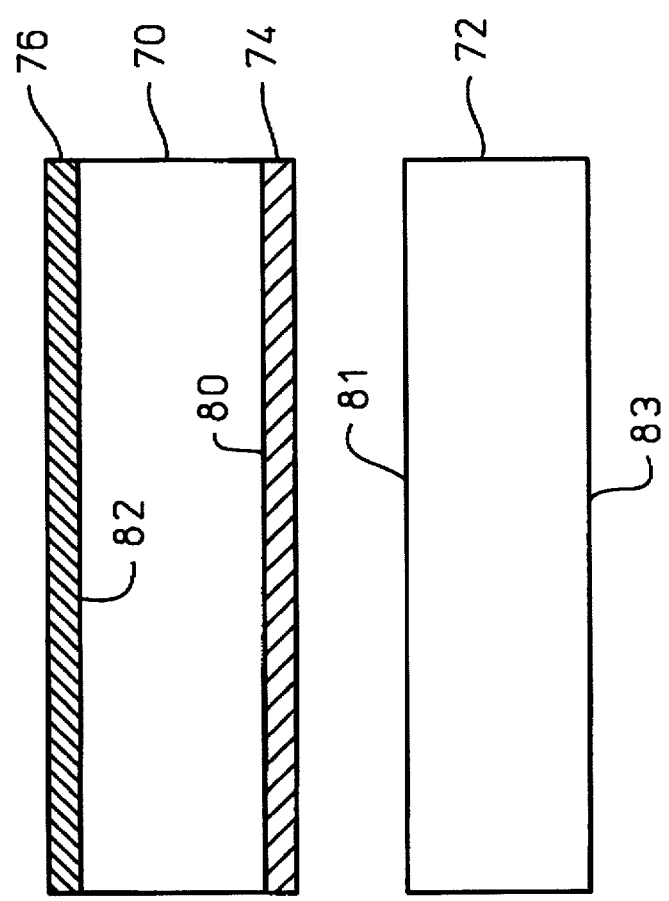
FIGS. 5 through 9 show the process of fabricating the integrated optical device of FIGS. 3 through 4C using batch processing.

It is further to be noted that the optical device 42 is not limited to integrating one optical filter and one mirror together. FIGS. 4D and 4H show two alternative embodiments of integrating two optical filters and mirrors into a single optical device (i.e., the optical device 200 or 300). FIG. 4D is a top view showing the optical device 200 in accordance with one alternative embodiment and FIGS. 4E and 4F illustrate the process of making the optical device 200. FIG. 4G shows the use of the optical device 200 in a photonics module 280.

As can be seen from FIG. 4D, the optical device 200 includes a mirror 243 applied to a side surface of a transparent block 250. An optical filter 244 is sandwiched by two transparent blocks 250 and 252 and another optical filter 245 is sandwiched by two transparent blocks 252 and 253. The optical filter 244 is for passing the light wavelength and the optical filter 245 is for passing the light of wavelength. Another mirror is applied to a side surface of the transparent block 247. FIGS. 4E and 4F show the process of making the optical device 200. FIG. 4G shows one application of the optical device 200 in a photonics module 280.

As can be seen from FIG. 4G, the photonics module 280 includes a mounting member 281 on which a laser 283, a monitor 284, spherical lenses 282 and 286, a photo detector 287, and a shield 285 are placed. The optical device 200 is attached to a side surface of the mounting member 281. As can be seen from FIG. 4G, the optical filter 244 is used to only let the light of one predetermined wavelength (e.g., $\lambda_2$) to reach the photo detector 287.

FIG. 4H is a top view showing the optical device 300 in accordance with another alternative embodiment. As can be seen from FIG. 4H, the optical device 300 includes a mirror 347 sandwiched by two transparent blocks 350 and 351 and an optical filter arrangement 343 sandwiched by two transparent blocks 350 and 352. The block 350 primarily serves as a spacing block and the blocks 351 through 353 primarily serve as protective blocks. The optical filter arrangement 343 includes two optical filters 344 and 345, one for passing the light of $\lambda_1$ wavelength and the other for passing the light of $\lambda_2$ wavelength. A second mirror 346 is provided to reflect the light of $\lambda_2$ wavelength to the optical filter 345. The mirror 346 is sandwiched by the protective blocks 352 and 353. The optical device 300 shown in FIG. 4H can be used, for example, in a multi-directional photonics module.

Referring back to FIGS. 4A–4C, the front and back surfaces 60 and 62 of the spacing block 50 and the front and back surfaces 64 and 66 of the protective block 52 are further attached with first and second glass slides 54 and 56. In one embodiment, each of the first and second glass slides 54 and 56 is made of glass. Alternatively, each of the first and second glass slides 54 and 56 is made of other type of transparent material.

Each of the first and second glass slides 54 and 56 has substantially the same refractive index as that of each of the spacing and protective blocks 50 and 52. In addition, the main surfaces of each of the first and second glass slides 54 and 56 are of optical quality. Attaching the first and second glass slides 54 and 56 to the spacing and protective blocks 50 and 52 means that the front and back surfaces 60, 62, 64, and 66 of the blocks 50 and 52 need not be of optical quality. This eliminates the cost that would otherwise be incurred by polishing these surfaces of the blocks 50 and 52 when fabricating the optical device 42.

The first glass slide 54 is attached to the spacing and protective blocks 50 and 52 to cover the front surfaces 60 and 64. The second glass slide 56 is attached to the spacing and protective blocks 50 and 52 to cover the back surfaces 62 and 66. As can be seen from FIGS. 4A–4C, each of the mirror 44 and the optical filter 43 intersects the surfaces 60, 62, 64, and 66 of the spacing and protective blocks 50 and 52 at an 45° angle. Alternatively, the angle can be greater or less than 45°. For example, the angle can be approximately 54°.

In one embodiment, the transparent material used to form the spacing and protective blocks 50 and 52 and the first and second glass slides 54 and 56 is glass. Alternatively, other transparent materials can be used to form the spacing and protective blocks 50 and 52 and the first and second glass slides 54 and 56. For example, epoxy or other transparent organic materials can be used to form the spacing and protective blocks 50 and 52 and the first and second glass slides 54 and 56.

In one embodiment, the first and second glass slides 54 and 56 are bonded to the spacing and protective blocks 50 and 52 using index-matching epoxy. This means that the epoxy used to bond the first and second glass slides 54 and 56 to the spacing and protective blocks 50 and 52 has a refractive index that matches that of the spacing and protective blocks 50 and 52 and the first and second glass slides 54 and 56. As described above, the refractive index of the first and second glass slides 54 and 56 matches that of the spacing and protective blocks 50 and 52. Alternatively, the first and second glass slides 54 and 56 can be attached to the spacing and protective blocks 50 and 52 by other known means.

In one embodiment, the main surface of each of the first and second glass slides 54 and 56 that is not attached to the spacing and protective blocks 50 and 52 is coated with an anti-reflective coating (not shown in FIGS. 4A–4C). Alternatively, both of the main surfaces of each of the first and second glass slides 54 and 56 is not coated with the anti-reflective coating. In addition, other coatings (e.g., highly-reflective coating) can be applied as desired and needed.

Referring to FIGS. 5 through 9, the process of fabricating the optical device 42 of FIGS. 4A–4C using batch processing in accordance with one embodiment of the present invention is described in more detail below. As can be seen from FIG. 5, an optical filter 74 and a mirror 76 are formed along two opposite side surfaces 80 and 82 of a first glass bar 70. The glass bar 70 has a predetermined thickness between the side surfaces 80 and 82.

Figure 6:
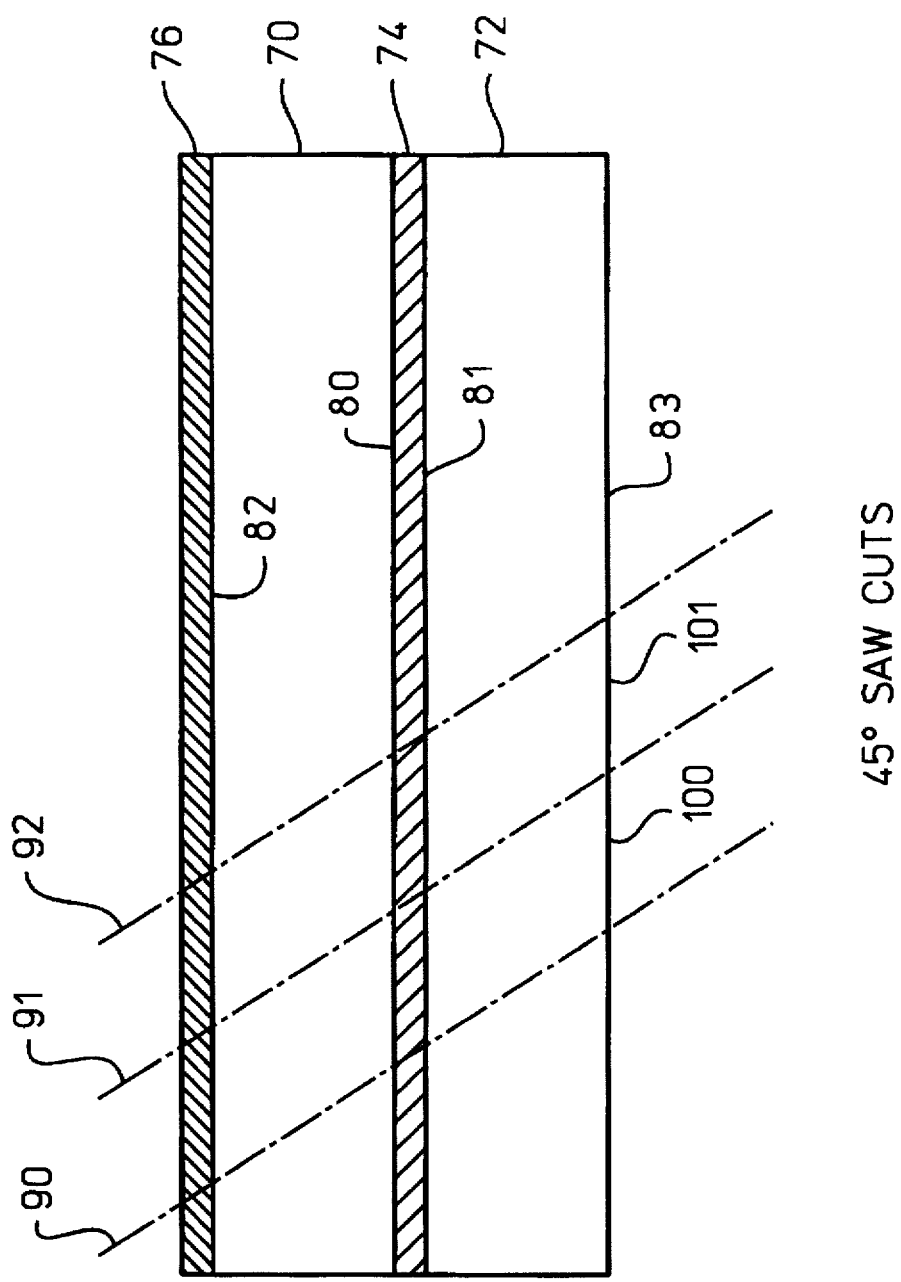

A second glass bar 72 is then bonded to the optical filter 74 using an index-matching epoxy so that the optical filter 74 is sandwiched between the glass bars 70 and 72 (see FIG. 6). Each of the first and second glass bars 70 and 72 has the same refractive index and the index-matching epoxy has the same refractive index as that of the first and second glass bars 70 and 72. Alternatively, other transparent materials can be used to produce the bars 70 and 72. For example, epoxy or other types of organic materials can be used to form the bars 70 and 72.

In one embodiment, the optical filter 74 contains one optical filter that passes light of a particular wavelength. In another embodiment, the optical filter 74 includes two optical filters, each passing light of a particular wavelength. This is done by applying two different optical filter stacks on the side surface 80, each stack being applied to a portion of the side surface 80. Alternatively, the optical filter 74 may include more than two filters, each passing light of a particular wavelength.

Further, a third glass bar (not shown) can be bonded to the mirror 76 such that the mirror 76 is sandwiched by two glass bars to protect the mirror from being damaged. In addition, a second mirror (also not shown) can be formed on the surface 83 of the second glass bar 72 and then sandwiched by the second glass bar 72 and a fourth glass bar (not shown) that is bonded to the second mirror.

Referring again to FIGS. 5–6, each of the first and second glass bars 70 and 72 is preferably hexahedral with six rectangular surfaces. Alternatively, the first and second glass bars 70 and 72 can be in other polyhedral shapes so long as the side surfaces 80 and 82 of the glass bar 70 are parallel to each other.

Figure 7:
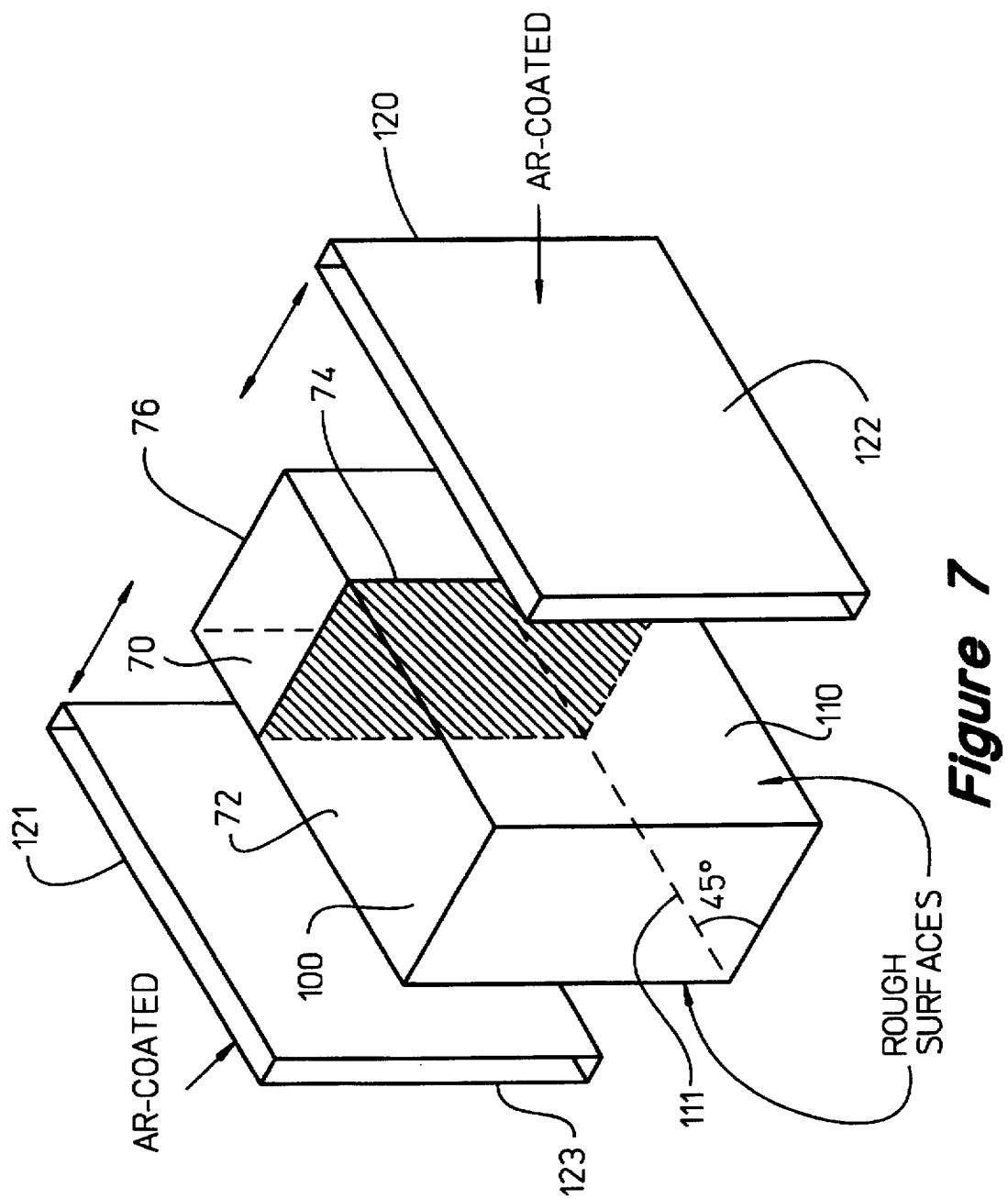

As can be seen from FIG. 6, the bonded first and second bars 70 and 72 are then cut to obtain a number of integrated filter/mirror elements (e.g., the integrated filter/mirror elements 100–101) along a number of parallel lines 90–92. The parallel lines 90–92 determine the yaw and pitch alignments of each of the integrated filter/mirror elements. The parallel lines 90–92 intersect each of the optical filter 74 and the mirror 76 at 45°. Alternatively and as described above, the parallel lines 90–92 can be at other angles with each of the optical filter 74 and the mirror 76. The parallel lines 90–92 are spaced such that each of the integrated filter/mirror element has a predetermined thickness between its cut surfaces. FIG. 7 shows the integrated filter/mirror element 100.

Referring to FIGS. 6–7, the bonded first and second bars 70 and 72 can be cut using, for example, a dicing saw (not shown). This causes the cut surfaces of each integrated filter/mirror element (such as the cut surfaces 110 and 111 of the integrated filter/mirror element 100) to be rough and not of optical quality. To eliminate the roughness of the cut surfaces, a first and a second glass slides (e.g., the glass slides 120 and 121) are bonded to each of the cut surfaces of each of the integrated filter/mirror elements using the index-matching epoxy. The epoxy fills in the gaps between the cut surface and the respective glass slide. As a result, the need to polish the cut surfaces of each of the integrated filter/mirror elements (e.g., the integrated filter/mirror element 100) is avoided. This minimizes the cost associated with making the integrated filter/mirror elements. Alternatively, the glass slides are not bonded to the cut surfaces. In this case, other known means (such as polishing process) can be used to make the cut surfaces of optical quality.

Figure 8:
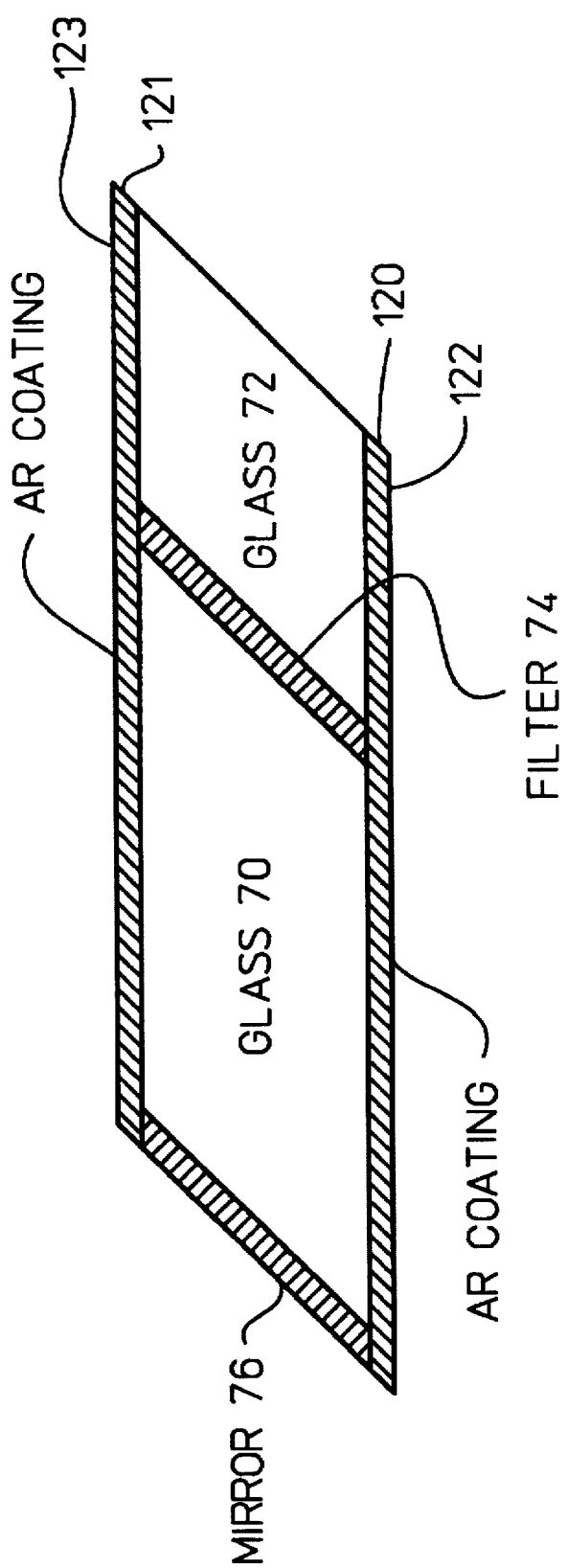
Figure 9:
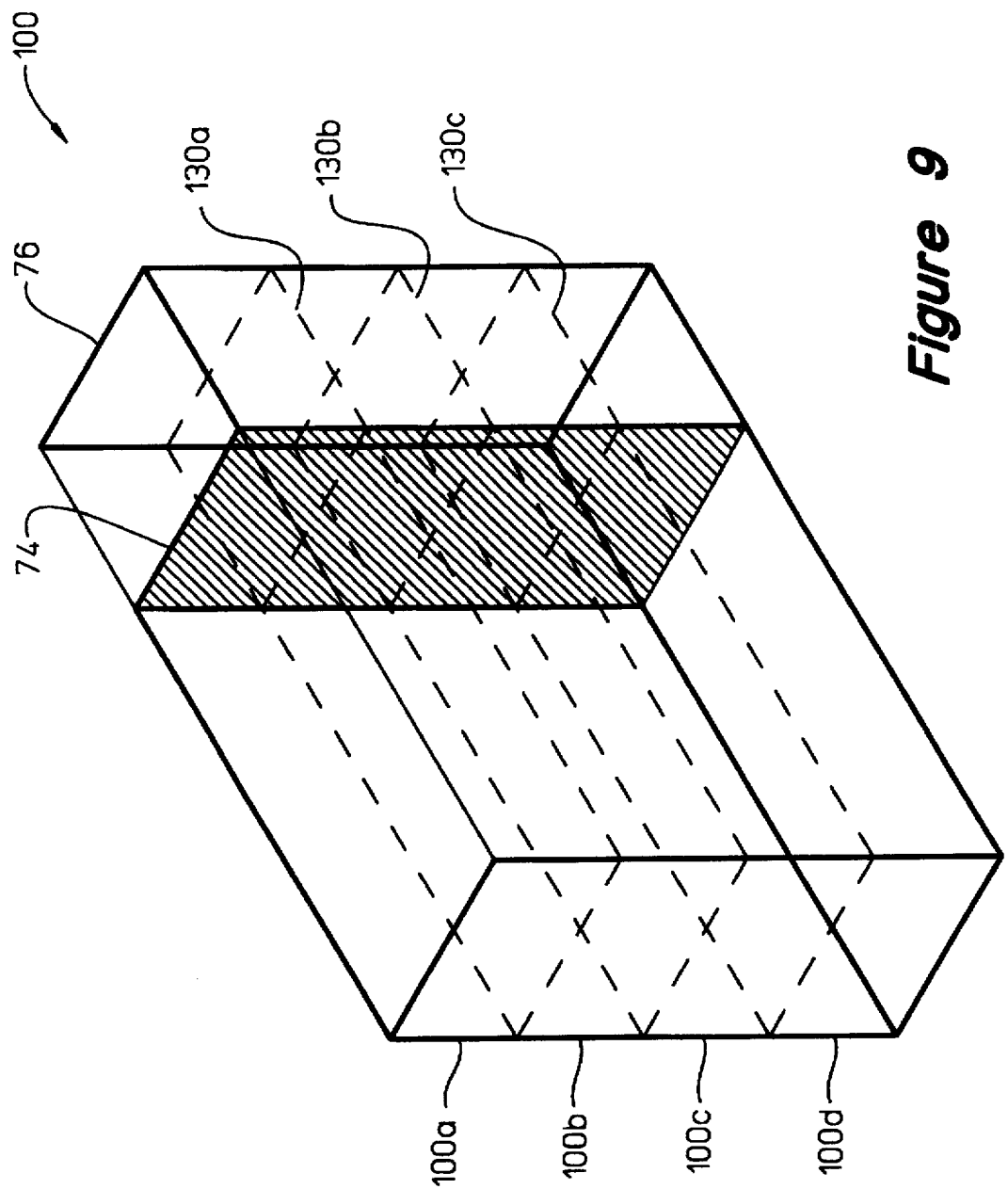

As can be seen from FIGS. 7–9, each of the glass slides 120–121 is coated with an anti-reflective coating (i.e., coatings 122 and 123). Alternatively, each of the glass slides 120–121 can be coated with other types of coatings. Moreover, each of the glass slides 120–121 can be selectively coated with different coatings. FIG. 8 is the top view showing the integrated filter/mirror element 100 bonded with the glass slides 120–121. The integrated filter/mirror element 100 is then cut along a number of parallel lines (e.g., lines 130a through 130c of FIG. 9) that are perpendicular to the optical filter 74 and the mirror 76 to obtain a number of identical optical devices (e.g., the optical devices 100a through 100d), each of which can be the optical device 42 of FIGS. 4A–4C. This shows the complete process of making the optical device 42 of FIGS. 4A–4C at low cost, in large volume, and with high precision.

The cost reduction can be illustrated as follows. Assuming the integration of the optical filter 74 and the mirror 76 resulted in M number of integrated filter/mirror elements, each producing N number of the optical devices identical to the optical device 42, the cost of integrating the optical filter 74 and the mirror 76 is divided by M times N. Likewise, the cost of setting up the alignments of the optical filter 74 and the mirror 76 is divided by M times N. This substantially reduces the cost of making each optical device because of the batch processing.

Figure 10:
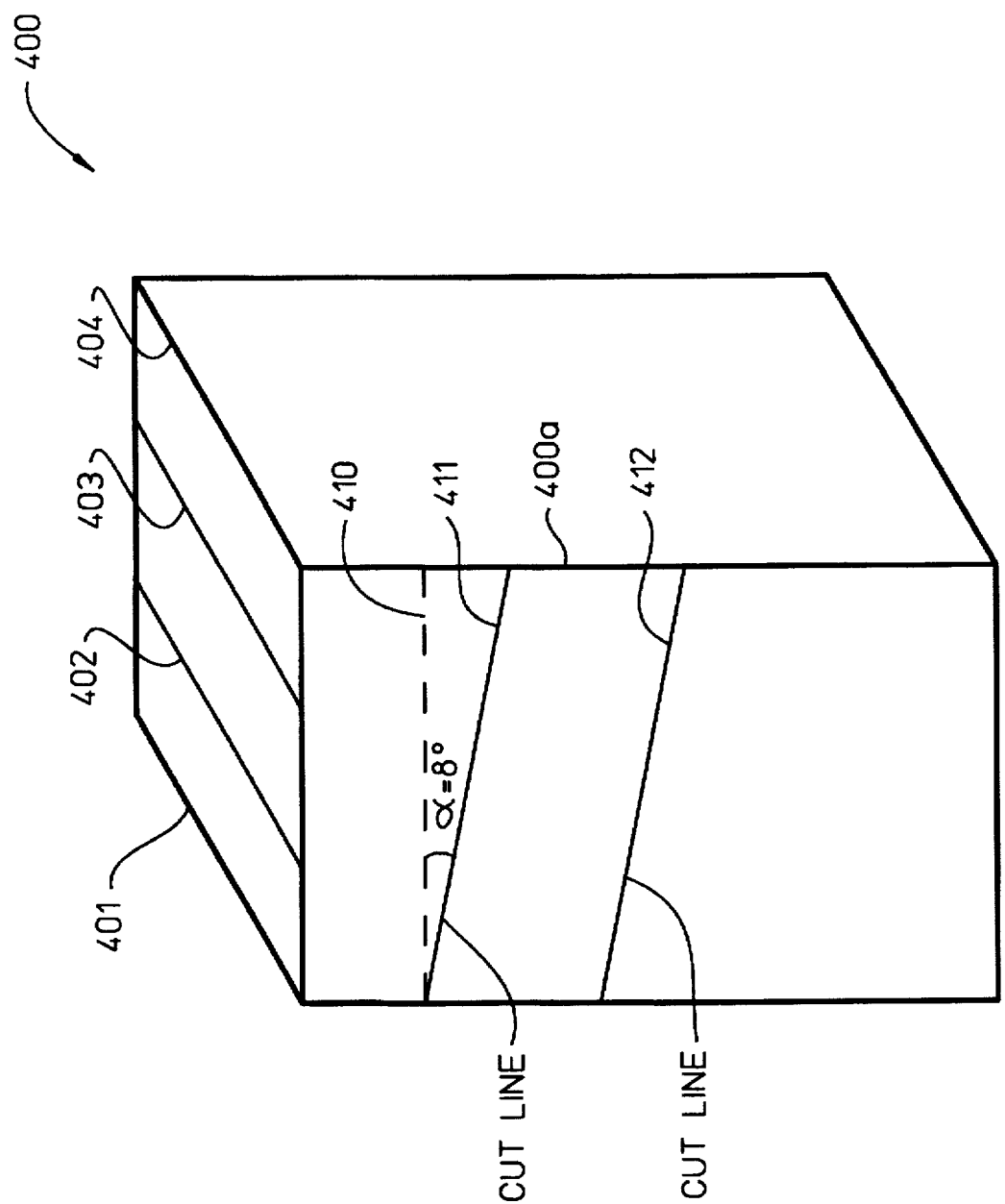
FIGS. 10 through 13 show another alternative embodiment of the integrated optical device of FIGS. 3 through 4C, showing that the optical filter and mirror of the integrated optical device are tilted with respect to a vertical plane.
Figure 11:
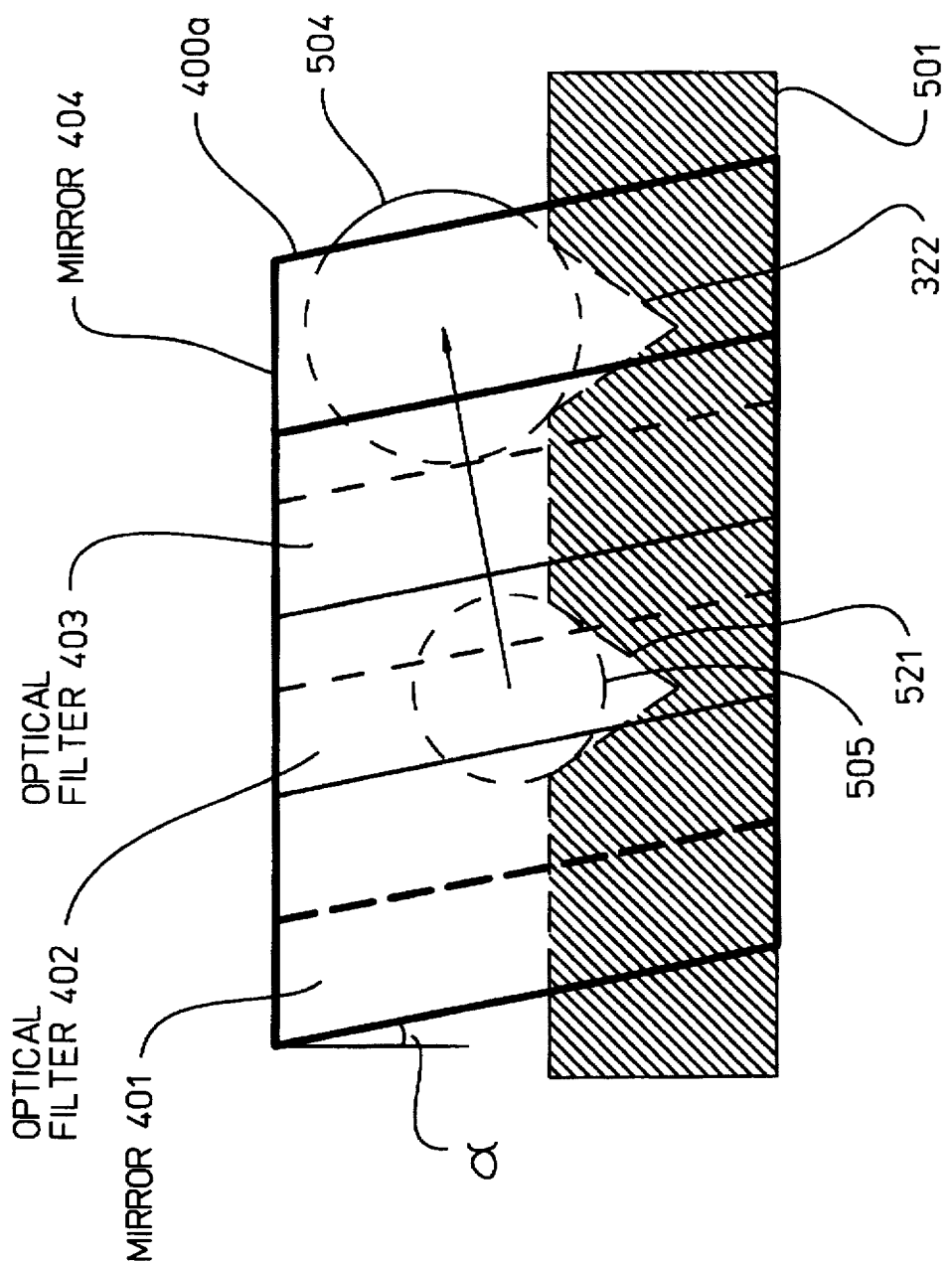

FIG. 10 shows an alternative embodiment of cutting the integrated filter/mirror element 100 of FIG. 9. As can be seen from FIG. 10, the filter/mirror element 400 includes mirrors 401 and 404 and optical filters 402 and 403. The filter/mirror element 400 is then cut along a number of parallel cut lines (e.g., the cut lines 411 and 412) to obtain, for example, the integrated optical device 400a. As can be seen from FIG. 10, the cut lines 411 and 412 intersect a horizontal line 410 at, for example, an 8° angle. The horizontal line 410 is perpendicular to the mirrors and the optical filters 401–404. This causes each of the optical filters and mirrors 401–404 to be tilted at the 8° angle with respect to the cut surfaces of the integrated optical device 400a along the cut lines 411 and 412, as can be seen from FIG. 11. FIG. 11 shows the front view of the integrated optical device 400a.

Alternatively, the angle can be greater or less than 8°. For example, the angle can be 12° or 0°.

Figure 12:
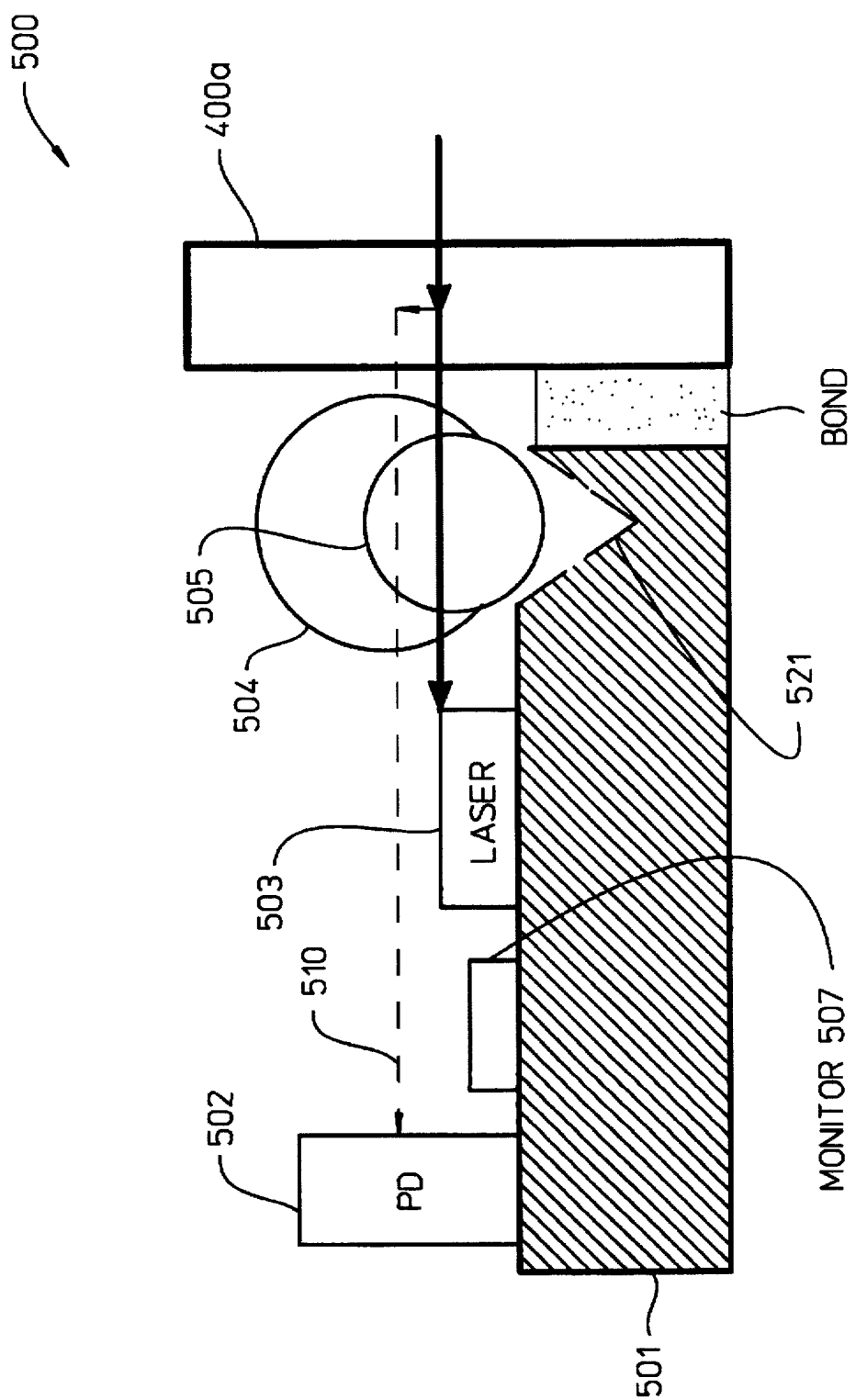
Figure 13:
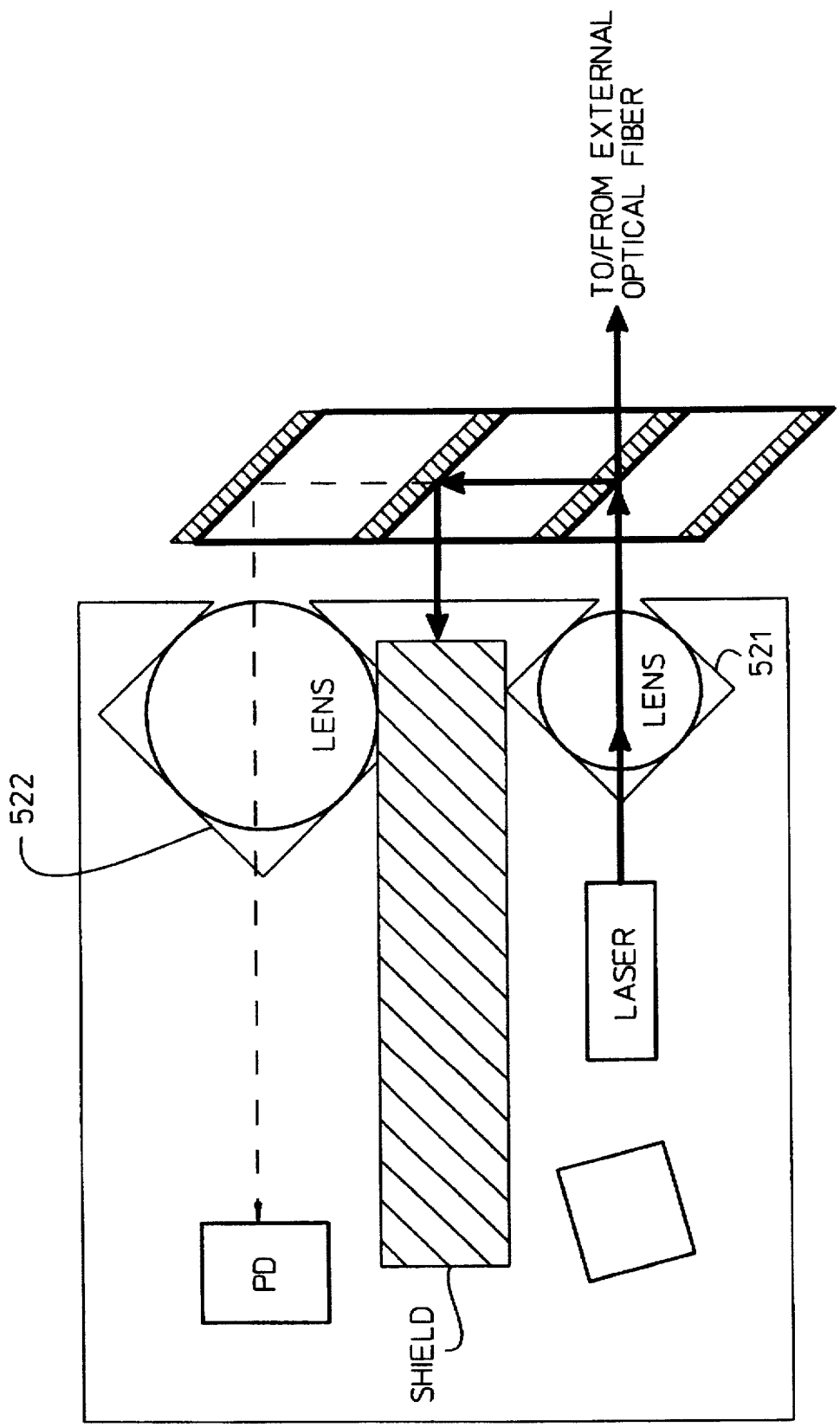

FIGS. 11 through 13 show the integrated optical device 400a coupled to a mounting member 501 of a photonics module 500. FIG. 11 is a front view and FIG. 12 is a side view of the photonics module 500. FIG. 13 is a top view of the module 500. As can be seen from FIGS. 11–13, the rifled optical filters and mirrors 401–404 help raise the optical axis 510 of the photo detector 502.

In the foregoing specification, the invention has been described with reference to specific embodiments thereof. It will, however, be evident to those skilled in the art that various modifications and changes may be made thereto without departing from the broader spirit and scope of the invention. The specification and drawings are, accordingly, to be regarded in an illustrative rather than a restrictive sense.

What is claimed is:

1. A method of making an integrated optical device, comprising the steps of:
   (A) applying an optical filter and a mirror to a first and a second side surface, respectively, of a first block of transparent material that has a predetermined thickness between the first and second side surfaces;
   (B) attaching a first side surface of a second block of transparent material to the optical filter such that the optical filter is between the first and second blocks;
   (C) cutting the first and second blocks such that each of a front and a back cut surface of the first and second blocks intersects the optical filter and the mirror at a predetermined angle.

2. The method of claim 1, further comprising the step of attaching a first and a second sheet of transparent material to the front and back cut surfaces, respectively.

3. The method of claim 2, further comprising the step of cutting along each of a plurality of lines that intersect the optical filter and the mirror at an angle that is equal to 90°±α in order to produce the integrated optical device by batch processing.

4. The method of claim 3, wherein α ranges between 0° and 12°.

5. The method of claim 4, wherein α is approximately 8°.

6. The method of claim 2, wherein the step of attaching the first and second sheets further composes the steps of
   (I) bonding a first main surface of the first sheet to the front cut surface using an epoxy;
   (II) bonding a first main surface of the second sheet to the back cut surface using the epoxy.

7. The method of claim 6, further comprising the step of applying an coating onto a second main surface of each of the first and second sheets, wherein the second main surface of each of the first and second sheets is of optical quality and is parallel to the first main surface of the respective one of the first and second sheets.

8. The method of claim 6, further comprising the step of selectively applying a plurality of coatings onto a second main surface of each of the first and second sheets, wherein the second main surface of each of the first and second sheets is of optical quality and is parallel to the first main surface of the respective one of the first and second sheets.

9. The method of claim 6, wherein each of the first and second sheets has a refractive index that matches that of the first and second blocks and the epoxy has a refractive index that matches that of the first and second blocks and the first and second sheets.

10. The method of claim 2, wherein the transparent material of each of the first and second blocks and each of the first and second sheets is glass.

11. The method of claim 1, further comprising the steps of
   (I) applying a second optical filter to a second side surface of the second block of transparent material, the second side surface of the second block having a predetermined distance from the first side surface of the second block;
   (II) attaching a first side surface of a third block of transparent material to the second optical filter such that the second optical filter is between the second and third blocks.

12. The method of claim 11, further comprising the step of applying a second mirror to a second side surface of the third block.

13. The method of claim 1, wherein the step (A) further comprises the steps of applying a plurality of optical filters to the first side surface of the first block of transparent material.

14. The method of claim 13, further comprising the step of applying a second mirror to a first side surface of the second block such that the second mirror is parallel to the plurality of optical filters.

15. The method of claim 1, wherein the predetermined angle is approximately 45°.

16. An integrated optical device, comprising:
   (A) a first block of transparent material having a first and a second side surface and a predetermined thickness between the first and second side surfaces;
   (B) a second block of transparent material;
   (C) a mirror applied to the first side surface of the first block;
   (D) an optical filter attached to the second side surface of the first block and a first side surface of the second block such that the optical filter is located between the first and second blocks, the first and second blocks having a front and a back cut surface intersecting the optical filter and the mirror at a predetermined angle.

17. The integrated optical device of claim 16, further comprising a first and a second sheet of transparent material attached to the front and back cut surfaces, respectively.

18. The integrated optical device of claim 17, wherein the optical filter is applied to the second side surface of the first block and then bonded to the first side surface of the second block, wherein the first and second blocks and the first and second sheets have substantially the same refractive index and are bonded together using an epoxy having a refractive index matching that of the first and second blocks and the first and second sheets.

19. The integrated optical device of claim 16, further comprising an coating applied onto a first main surface of each of the first and second sheets, wherein the first main surface of each of the first and second sheets is of optical quality and is parallel to a second main surface of the respective one of the first and second sheets that is attached to the front and back cut surfaces of the first and second blocks.

20. The integrated optical device of claim 16, further comprising a plurality of coatings selectively applied onto a first main surface of each of the first and second sheets, wherein the first main surface of each of the first and second sheets is of optical quality and is parallel to a second main surface of the respective one of the first and second sheets that is attached to the front and back cut surfaces of the first and second blocks.

21. The integrated optical device of claim 17, wherein the transparent material of each of the first and second blocks and each of the first and second sheets is glass.

22. The integrated optical device of claim 16, wherein the optical filter includes a plurality of optical filters applied to the second side surface of the first block, each of the plurality of optical filters passing light of a particular wavelength.

23. The integrated optical device of claim 22, further comprising a second mirror applied to a second side surface of the second block remote from the first side surface of the second block such that the second mirror is parallel to the plurality of optical filters.

24. The integrated optical device of claim 16, wherein the optical filter and the mirror intersect a top and a bottom surface of each of the first and second blocks at an angle of $90°\pm\alpha$.

25. The integrated optical device of claim 24, wherein $\alpha$ ranges between $0°$ and $12°$.

26. The integrated optical device of claim 25, wherein $\alpha$ is approximately $8°$.

27. The integrated optical device of claim 16, further comprising (I) a third block of transparent material;

(II) a second optical filter attached to (1) a second side surface of the second block and (2) a first side surface of the third block such that the second optical filter is located between the second and third blocks.

28. The integrated optical device of claim 27, wherein each of the first, second, and third blocks of transparent material is hexahedral.

29. The integrated optical device of claim 27, further comprising a second mirror applied to a second side surface of the third block.

\* \* \* \* \*